United States Patent
Yang et al.

(10) Patent No.: US 11,704,487 B2
(45) Date of Patent: Jul. 18, 2023

(54) SYSTEM AND METHOD FOR FASHION ATTRIBUTES EXTRACTION

(71) Applicants: Beijing Jingdong Shangke Information Technology Co., Ltd., Beijing (CN); JD.com American Technologies Corporation, Mountain View, CA (US)

(72) Inventors: Shanglin Yang, Sunnyvale, CA (US); Hui Zhou, Sunnyvale, CA (US)

(73) Assignees: BEIJING JINGDONG SHANGKE INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 1140 days.

(21) Appl. No.: 16/375,308

(22) Filed: Apr. 4, 2019

(65) Prior Publication Data

US 2020/0320348 A1 Oct. 8, 2020

(51) Int. Cl.
| | |
|---|---|
| G06F 40/30 | (2020.01) |
| G06F 40/216 | (2020.01) |
| G06N 5/04 | (2023.01) |
| G06F 18/214 | (2023.01) |
| G06V 30/18 | (2022.01) |
| G06V 30/19 | (2022.01) |
| G06V 10/82 | (2022.01) |
| G06V 20/00 | (2022.01) |
| G06V 20/62 | (2022.01) |
| G06N 3/08 | (2023.01) |
| G06V 30/10 | (2022.01) |

(52) U.S. Cl.
CPC ........ *G06F 40/216* (2020.01); *G06F 18/2155* (2023.01); *G06F 40/30* (2020.01); *G06N 5/04* (2013.01); *G06V 10/82* (2022.01); *G06V 20/00* (2022.01); *G06V 20/62* (2022.01); *G06V 30/18057* (2022.01); *G06V 30/19173* (2022.01); *G06N 3/08* (2013.01); *G06V 30/10* (2022.01)

(58) Field of Classification Search
CPC ........ G06N 5/04; G06N 3/0454; G06F 40/30; G06F 40/216; G06F 18/2155; G06F 40/284; G06F 18/213; G06K 9/6256; G06K 9/6259; G06K 9/628; G06K 9/00536; G06K 9/00523
See application file for complete search history.

(56) References Cited

U.S. PATENT DOCUMENTS

| | | | | |
|---|---|---|---|---|
| 11,037,071 | B1 * | 6/2021 | Tekiela | G06N 20/00 |
| 2005/0169558 | A1 * | 8/2005 | Dance | G06V 20/10 |
| | | | | 707/E17.023 |
| 2008/0082426 | A1 * | 4/2008 | Gokturk | G06Q 30/0643 |
| | | | | 707/E17.014 |
| 2014/0376804 | A1 * | 12/2014 | Akata | G06K 9/6234 |
| | | | | 382/159 |
| 2017/0061250 | A1 * | 3/2017 | Gao | G06V 10/82 |
| 2017/0206435 | A1 * | 7/2017 | Jin | G06K 9/628 |
| 2018/0121533 | A1 * | 5/2018 | Magnani | G06F 16/248 |
| 2019/0095466 | A1 * | 3/2019 | Zhai | G06F 16/56 |
| 2019/0205393 | A1 * | 7/2019 | Wang | G06N 3/0454 |

FOREIGN PATENT DOCUMENTS

WO    WO-2018208871 A1 *  11/2018    ........... G06K 9/6203

OTHER PUBLICATIONS

Dligach et al, Title: Semi-supervised Learning for Phenotyping Tasks, publisher: AMIA Annu Symp Proc, published: 2015, pp. 1-17 (Year: 2015).*
Ak et al, Title: "Efficient Multi-Attribute Similarity Learning Towards Attribute-based Fashion Search", date: 2018, publisher: IEEE, pp. 1-9 (Year: 2018).*
Ren, Shaoqing et al., Faster R-CNN: Towards real-time object detection with region proposal networks, Advances in neural information processing systems, 2015.
Dong, Jianfeng et al., Predicting Visual Features from Text for Image and Video Caption Retrieval. arXiv:1709.01362, 2018.
Dong, Hao, et al. I2T2I: Learning Text to Image Synthesis with Textual Data Augmentation, arXiv:1703.06676, 2017.

* cited by examiner

*Primary Examiner* — Wilson W Tsui
(74) *Attorney, Agent, or Firm* — Scully, Scott, Murphy & Presser, P.C.

(57) ABSTRACT

A system and a method for training an inference model using a computing device. The method includes: providing a text-to-vector converter; providing the inference model and pre-training the inference model using labeled fashion entries; providing non-labeled fashion entries; separating each of the non-labeled fashion entries into a target image and target text; converting the target text into a category vector and an attribute vector using the text-to-vector converter; processing the target image using the inference model to obtain processed target image and target image label; comparing the category vector to the target image label; when the category vector matches the target image label, updating the target image label based on the category vector and the attribute vector to obtain updated label; and retraining the inference model using the processed target image and the updated label.

17 Claims, 5 Drawing Sheets

SYSTEM AND METHOD FOR FASHION ATTRIBUTES EXTRACTION

CROSS-REFERENCES

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to image processing technology, and more particularly to a system and method for extracting attributes from fashion images.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

With the growing popularity of e-commerce, a large number of products are available for consumers, especially fashion products. Showing attributes or features of those products are essential for the consumers to evaluate the products efficiently. However, it is challenging to accurately and completely label the attributes of the products due to lack of information or non-standardized format of the information.

Therefore, an unaddressed need exists in the art to address the aforementioned deficiencies and inadequacies.

SUMMARY OF THE INVENTION

In certain aspects, the present invention relates to a method for training an inference model using a computing device. In certain embodiments, the method includes:

providing a text-to-vector converter;

providing the inference model and pre-training the inference model using a first number of labeled fashion entries;

providing a second number of fashion entries, wherein the fashion entries are not labeled;

separating each of the second number of fashion entries into a target image and target text;

converting the target text into a category vector and an attribute vector using the text-to-vector converter, wherein the category vector comprises a plurality of dimensions corresponding to categories of fashion, and the attribute vector comprise a plurality of dimensions corresponding to attributes of fashion;

processing the target image using the inference model to obtain processed target image and target image label;

comparing the category vector to the target image label;

when the category vector matches the target image label, updating the target image label based on the category vector and the attribute vector to obtain updated label; and retraining the inference model using the processed target image and the updated label.

In certain embodiments, the step of converting the target text into the category vector and the attribute vector includes:

providing a category name list and an attribute name list, wherein the category name list comprises a word list of categories of fashion, and the attribute name list comprises a word list of attributes of fashion;

initializing the category vector and the attribute vector;

splitting the target text to obtain target words;

comparing each of the target words to the category name list and the attribute name list to obtain a similarity score;

update the category vector or the attribute vector when the similarity score is greater than a threshold.

In certain embodiments, the step of initializing the category vector and the attribute vector is performed by:

defining a number of dimensions of the category vector as a number of categories in the category name list; and defining a number of dimensions of the attribute vector as a number of attributes in the attribute name list.

In certain embodiments, the step of splitting the target text to obtain target words comprises:

splitting the target text into sentences;

splitting each of the sentences into split words; and removing non-fashion words from the split words to obtain the target words.

In certain embodiments, the step of comparing each of the target words to the category name list and the attribute name list to obtain the similarity score is performed by:

converting each of the target words into a target vector by a word-to-vector model;

converting the category name list and the attribute name list into reference vectors using the word-to-vector model; and comparing the target vector to the reference vectors in a vector space, wherein the word-to-vector model is pre-trained with words in fashion.

In certain embodiments, the similarity score is defined as 1 when the target vector is the same as one of the inference vectors, the similarity score is defined as 0 when the target vector is remote to all the inference vectors, and the threshold is set at about 0.8.

In certain embodiments, each of the labeled fashion entries comprises a label, wherein the label is a word related to a fashion feature of an image.

In certain embodiments, the method further includes: when each dimension of the category vector has a value of 0, updating the target image label by defining the target image label as empty.

In certain embodiments, the method further includes: when the category vector doesn't match the target image label, providing a user interface for updating the target label.

In certain embodiments, the first number is about or less than 2000, and the second number is greater than 1 million.

In certain aspects, the present invention relates to a system for training an inference model. In certain embodiments, the system includes:

a computing device, comprising a processor and a storage device storing computer executable code, wherein the computer executable code comprises a text-to-vector converter, the inference model, a first number of labeled fashion entries, and a second number of fashion entries that are not labeled, and the computer executable code, when executed at the processor, is configured to:

pre-train the inference model using the first number of labeled fashion entries;

separate each of the second number of fashion entries into a target image and target text;

convert the target text into a category vector and an attribute vector using the text-to-vector converter, wherein the category vector comprises a plurality of dimensions corresponding to categories of fashion, and the attribute vector comprises a plurality of dimensions corresponding to attributes of fashion;

process the target image using the inference model to obtain processed target image and target image label;

compare the category vector to the target image label;

when the category vector matches the target label, update the target label based on the category vector and the attribute vector to obtain updated label; and retrain the inference model using the processed image and the updated label.

In certain embodiments, the computer executable code, is configured to covert the target text into the category vector and the attribute vector by:

providing a category name list and an attribute name list, wherein the category name list comprises a word list of categories of fashion, and the attribute name list comprises a word list of attributes of fashion;

initializing the category vector and the attribute vector by defining a number of dimensions of the category vector as a number of categories in the category name list, and defining a number of dimensions of the attribute vector as a number of attributes in the attribute name list;

splitting the target text into sentences, splitting each of the sentences into split words, and removing non-fashion words from the split words to obtain target words;

comparing each of the target words to the category name list and the attribute name list to obtain a similarity score;

update the category vector or the attribute vector when the similarity score is greater than a threshold.

In certain embodiments, the computer executable code is configured to obtain the similarity score by:

converting each of the target words into a target vector by a word-to-vector model;

converting the category name list and the attribute name list into reference vectors using the word-to-vector model; and comparing the target vector to the reference vectors in a vector space, wherein the word-to-vector model is pre-trained with words in fashion.

In certain embodiments, the similarity score is defined as 1 when the target vector is the same as one of the inference vectors, the similarity score is defined as 0 when the target vector is remote to all the inference vectors, and the threshold is set at about 0.8.

In certain embodiments, each of the labeled fashion entries comprises a label, wherein the label is a word related to a fashion feature of an image.

In certain embodiments, the computer executable code is further configured to, when each dimension of the category vector has a value of 0, update the target image label by defining the target image label as empty.

In certain embodiments, the computer executable code is further configured to, when the category vector doesn't match the target image label, provide a user interface for updating the target image label.

In certain embodiments, the first number is about or less than 2000, and the second number is greater than 1 million.

In certain aspects, the present invention relates to a non-transitory computer readable medium storing computer executable code. The computer executable code includes a text-to-vector converter, an inference model, a first number of labeled fashion entries, and a second number of fashion entries that are not labeled, and the computer executable code, when executed at a processor of a computing device, is configured to:

pre-train the inference model using the first number of labeled fashion entries;

separate each of the second number of fashion entries into a target image and target text;

convert the target text into a category vector and an attribute vector using the text-to-vector converter, wherein the category vector comprises a plurality of dimensions corresponding to categories of fashion, and the attribute vector comprises a plurality of dimensions corresponding to attributes of fashion;

process the target image using the inference model to obtain processed target image and target image label;

compare the category vector to the target image label;

when the category vector matches the target label, update the target label based on the category vector and the attribute vector to obtain updated label; and retrain the inference model using the processed image and the updated label.

In certain embodiments, the computer executable code is further configured to:

when each dimension of the category vector has a value of 0, update the target image label by defining the target image label as empty; and when the category vector doesn't match the target image label, provide a user interface for updating the target image label.

In certain aspects, the present disclosure relates to a method for training an inference model using a computing device. In certain embodiments, the method includes:

providing a text-to-vector converter;

providing the inference model and pre-training the inference model using a first number of labeled entries, wherein labels are categories of the entries;

providing a second number of entries, wherein the entries are not labeled;

separating each of the second number of entries into a target image and target text;

converting the target text into a category vector and an attribute vector using the text-to-vector converter, wherein the category vector comprises a plurality of dimensions corresponding to the categories of the entries, and the attribute vector comprises a plurality of dimensions corresponding to attributes of the entries;

processing the target image using the inference model to obtain processed target image and target image label;

comparing the category vector to the target image label;

when the category vector matches the target image label, updating the target image label based on the category vector and the attribute vector to obtain updated label.

In certain aspects, the present disclosure relates to a non-transitory computer readable medium storing computer executable code, wherein the computer executable code, when executed at a processor of a computing device, is configured to perform the method as described above.

In certain aspects, the present disclosure relates to a system for training an inference model, comprising a computer device, the computer device comprising a processor and a storage device storing computer executable code, wherein the computer executable code, when executed at the processor, is configured to perform the method as described above.

These and other aspects of the present invention will become apparent from following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
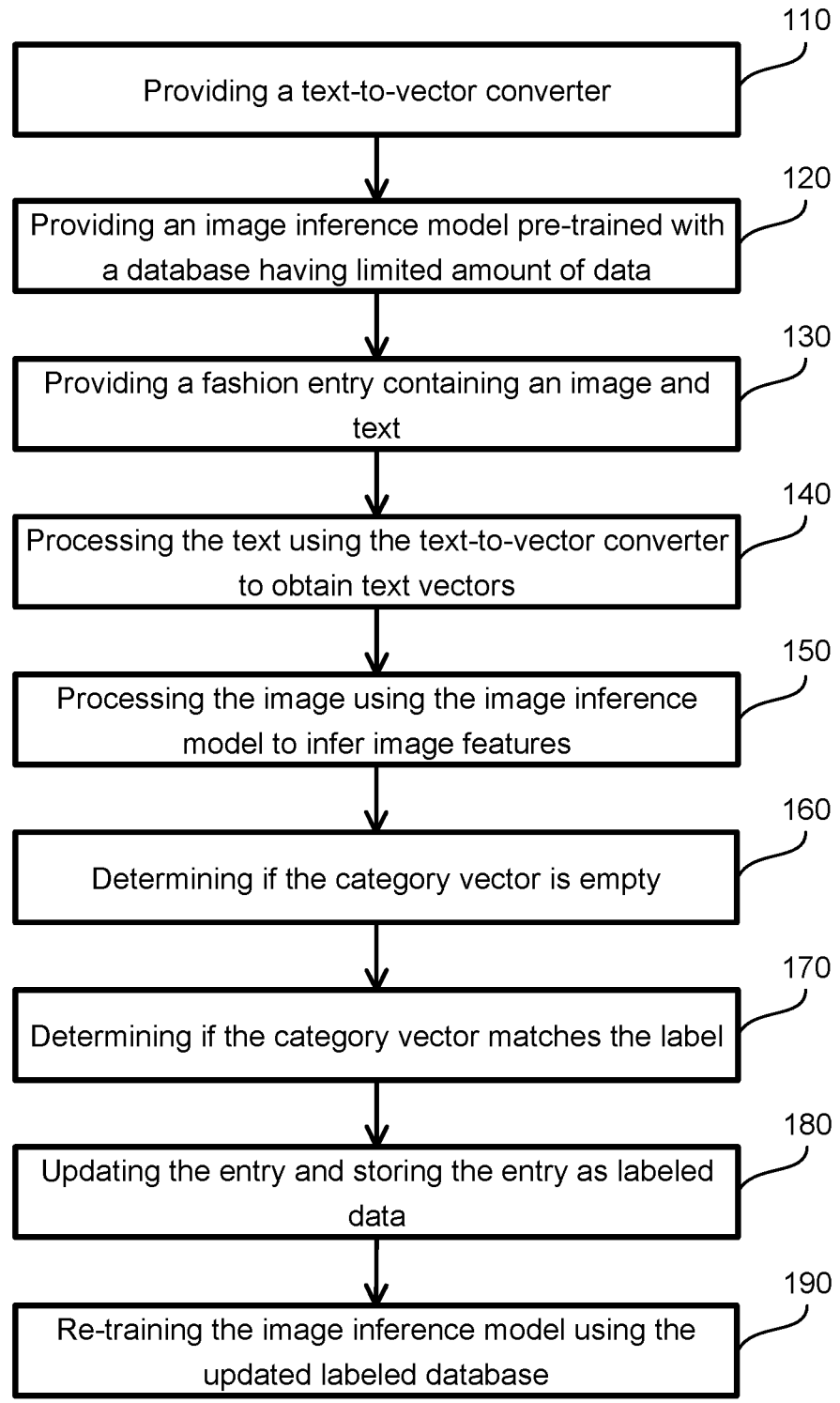
FIG. 1 depicts a flowchart of training an image inference model according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term "Word2vec," as used herein, generally refers to a group of related models that are used to produce word embeddings. These models are shallow, two-layer neural networks that are trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space.

The present invention relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present invention will now be described more fully hereinafter with reference to the accompanying drawings, in which embodiments of the present invention are shown. This invention may, however, be embodied in many different forms and should not be construed as limited to the embodiments set forth herein; rather, these embodiments are provided so that this invention will be thorough and complete, and will fully convey the scope of the present invention to those skilled in the art.

In accordance with the purposes of present invention, as embodied and broadly described herein, in certain aspects, the present invention relates to a method for training an image inference model which can extract fine-grained attributes from fashion-related images with minimum human supervision. In certain embodiments, the method fuses image information and text information, builds an explainable and scalable framework utilizing latent constrain from both, such that the image inference model can learn from noisy e-commence dataset without manual label cleaning.

Specifically, at first, a specific target feature vector is defined for fashion attribute which clustered from large of articles using text information extraction: 1) Split the article as well as sentence and filter each one word; 2) After filtering, use Word2Vect model to calculate similarity score between splitted words and word in target list: if the similarity score larger than the threshold value, the text is considered to contain the corresponding attribute; and 3) Complete the analysis of all the sentences and output the category and the attribute vectors.

Then, semi-supervised or non-supervised object detection is implemented, which starts with a small dataset and iteratively update the database from the unlabeled data: 1) Step one, start with the initial small-scale training data (number of datasets=2000) to do the initial training and finish full training (training data recognition rate of 95% or more); 2) Step two, inference the original unlabeled data with the training generated model and filter the output results under the supervision of the generated text vector automatically; 3) Step three, put the filtered data into the training data and re-train the model, repeat until all data labeled.

Finally, text and image are combined: word vector is used as the target and the image is transformed to text dimension. Through the text vector extraction and image detection, the category vector/label vector+multiple object area are obtained. Then the vector and its corresponding object area are re-matched, and used as the training input to the fine-grained classification training.

By the above embodiments of the present invention, the method provides advantages of: 1) The detection does not require large amount of labeled dataset for training; 2) The model learns from noisy unlabeled data using both text and image info, not only combine the info together to get better result but also feed back to optimize both model; 3) The work can be dynamically extended, the length of the entire vector and target attributes are calculated by key figures and statistics, and don't need to be pre-defined. When a new category or new style added, the vector length and target detection results can be extended; 4) The target vector is explainable: Each value within the vector has corresponding meaning, could be the sleeve shape, collar shape or the style.

By fusing the text and image information, the method according to certain embodiments of the present invention could extract fine-grained attributes and product object location from image without large amount of labeled data.

FIG. 1 depicts a flowchart of training an image inference model according to certain embodiments of the present invention. In certain embodiments, the training is performed by a computing device, and the computing device includes a processor, a memory, and a storage device storing a text-to-vector converter, the image inference model, databases, and codes for training the image inference model. It should be particularly noted that, unless otherwise stated in the present invention, the steps of the method may be arranged in a different sequential order, and are thus not limited to the sequential order as shown in FIG. 1.

As shown in FIG. 1, at procedure 110, the computing device provides or stores a text-to-vector converter. In certain embodiments, the text-to-vector converter obtains words in the text, filters the words, compares the filtered words to category names (words) and attribute names (words) in a name table, and generates a category vector and an attribute vector based on the comparison results. The name table has a category name list and an attribute name list. The category name list includes words of fashion categories, such as jeans, jackets, dresses, shirts, sweaters, pants, shorts; and the attribute name list includes words of fashion attributes, such as long sleeve, short sleeve, puff sleeve, sleeveless, v-neck, round/crew neck, square neck, split neck, straight, wide leg, A-line, bubble, circle, mini, broken. In certain embodiments, there are about 100 categories and over 30 attributes listed in the name table, which is sufficient to characterize fashion products. At the same time, the name table is easily expandable, and thus can include more categories and more attributes.

At procedure 120, the computing device provides an image inference model, or namely an inference model or a fashion attribute extraction model. In certain embodiments, the image inference model is a convolutional neural network (CNN) model, which is pre-trained using labeled data in a labeled database. The labeled database includes limited amount of data. In one example, the labeled database has about 2000 labeled images, and the labels include category word(s) and optionally attribute words. In one example, the label has the following information:

---

Cloth_one:
    {
    ' category': T-shirt;
      'attributes': {
        'color': White;
        'pattern': Horizontal striped;
        'sleeve length': long-sleeve;
        'sleeve shape': standard;
        'material': Chiffon;
        'neck shape': V-neck
      }
    }

---

When the text-to-vector converter and the image inference model are available, the computing device can process an entry of a fashion using the text-to-vector converter and the image inference model. The entry of the fashion may be a product provided by a seller in an e-commerce platform, a product listed on a merchant website, or an advertorial. At procedure 130, an entry of a fashion is provided or retrieved by the computing device. The entry includes at least one image and text. The procedure 130 may further include separating the text and the image of the fashion entry, and sends the text and the image respectively to the text-to-vector converter and the image inference model.

At procedure 140, the text-to-vector converter receives or retrieves the text from the fashion entry, and processes the text to obtain vectors corresponding to the text. In certain embodiments, the vectors include a category vector and an attribute vector.

At procedure 150, the image inference model receives or retrieves the image from the entry, and processes the image to obtain image feature. The image feature includes bounding boxes, location of the bounding boxes, and labels or annotations of the bounding boxes. The label of a bounding box includes the fashion category corresponding to the image part in the bounding box. In certain embodiments, the label includes both fashion category and fashion attribute. In certain embodiments, the fashion category and the attribute are words.

Then, when both the text vectors and the image feature are available, the computing device determines fashion category and attributes of the entry based on the text vectors and the image feature. Specifically, at procedure 160, the computing device determines if the category vector is 0 or in other words empty; and at procedure 170, when the category vector is not 0, the computer devices retrieves category from the category vector, and compares the retrieved category to the label(s) of the image feature.

The judgement from procedure 160 and 170 can then be used at procedure 180, where the computing device updates the entry and stores the entry as labeled data. Specifically, under the first situation, the category vector is determined to be 0 at procedure 160, which means that the entry is not a fashion product, the computing device will set the labels of the image feature to 0 or empty, and stores the empty labels as labeled data, so as to update the labeled data (database). Here, the image feature newly stored as the labeled data is a negative data set, because the image contains no or empty fashion feature.

Under the second situation, the category vector from the text is not 0, and the computing device retrieves the category information (or category word) from the category vector, and compares or matches the category information to the category information (or category word) stored in the label of the image feature. If the category information from the category vector and from the image label match, that is, the category information from the text of the entry is the same as or similar to the category information inferred from the image, the computer device sets the label to include category information and attribute information from the text vectors, and stores the updated labels to the labeled database, so that the updated label includes both the category information and the attribute information. In other words, the original label in the labeled database includes category information, but may or may not include attributes, while the updated label includes both category and attributes. In certain embodiments, the image inference model provides several bounding boxes of the image and the corresponding labels, and the label of one of the bounding boxes matches the label from the text, then the stored information for updating the labeled data base may be: the whole image and the correct label, or the corresponding bounding box and the correct label.

Under the third situation, when the category information from the category vector and the category information from the labels from the image feature don't match, the computing device may discard the entry, or alternatively, provide the results through a user interface to a user, such that a user can enter or revise the category and attributes of the entry, and then stores the category and attributes of the entry into the labeled database.

After storing certain number of entries and the corresponding category and attributes into the labeled database, at procedure 190, the computing device can retrain the image inference model using the updated labeled database.

Figure 2:
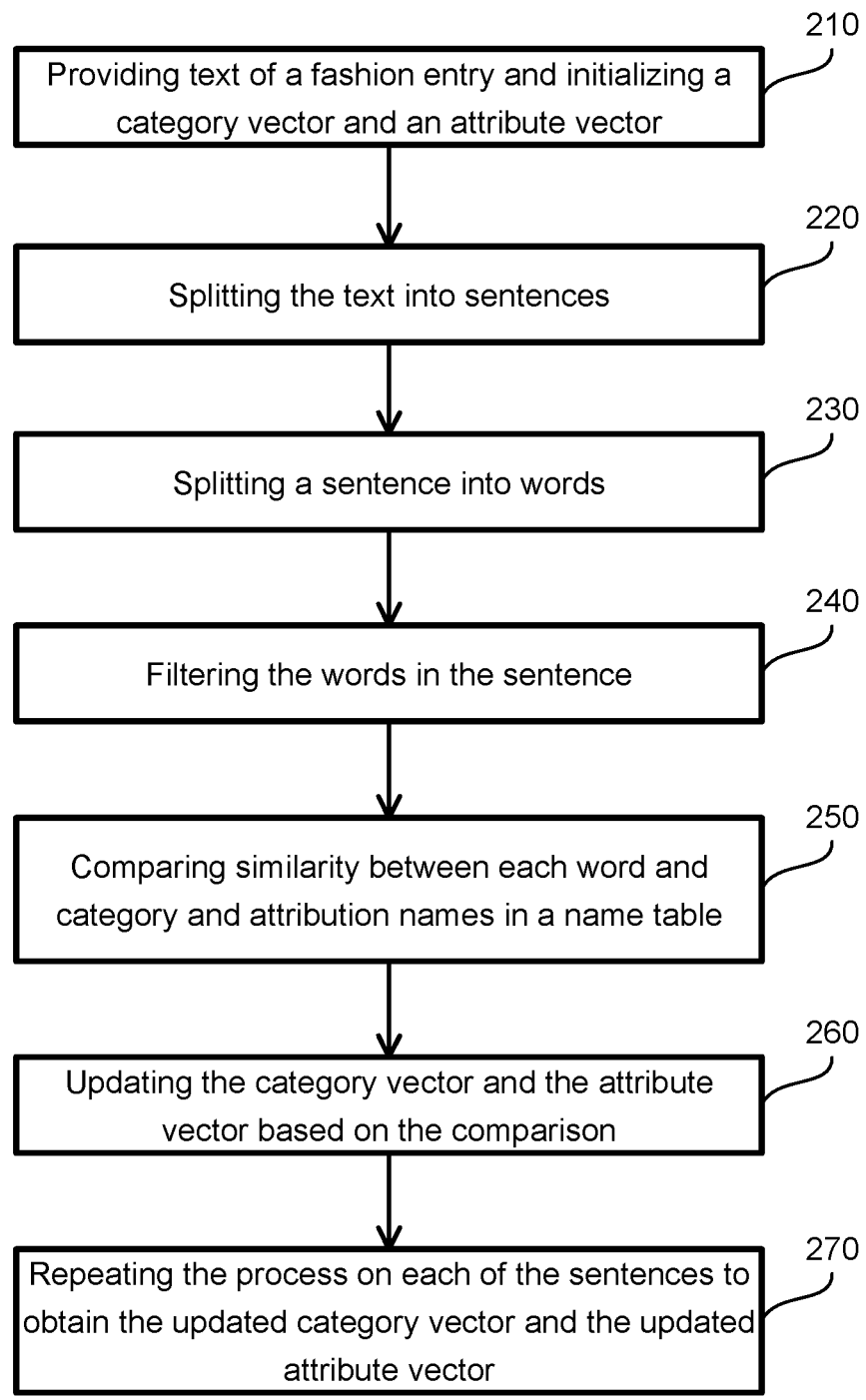
FIG. 2 depicts a flowchart of processing text of a fashion product according to certain embodiments of the present invention.

FIG. 2 depicts a flowchart of processing text of a fashion product according to certain embodiments of the present invention. In certain embodiments, the process shown in FIG. 2 corresponds to the procedure 140 in FIG. 1. It should be particularly noted that, unless otherwise stated in the present invention, the steps of the method may be arranged in a different sequential order, and are thus not limited to the sequential order as shown in FIG. 2.

At procedure 210, text of a fashion entry is provided, and a category vector and an attribute vector are initialized. The fashion entry may be a fashion product and its description provided by a seller on an e-commerce platform, or a fashion product and its description listed on a merchant website, or an advertorial on a fashion website or a fashion magazine that relates to a fashion product. The fashion entry includes text and an image. At this step, the computer device receives or retrieves the text from the fashion entry. Before or after receiving the text, two vectors are initialized for characterizing the text of the fashion entry. The two vectors are category vector $Y\_c$ and attributer vector $Y\_a$, where $Y\_c$ is in a format of $Y\_c=(C_1, C_2, C_3, \ldots, C_m)$, and $Y\_a$ is in the format of $Y\_a=(A_1, A_2, A_3, \ldots, A_n)$. Each of $C_1, C_2, C_3, \ldots, C_m$ corresponds to a category of fashion products, such as jeans, jacket, dress; and each of $A_1, A_2, A_3, \ldots, A_n$ corresponds to an attribute of fashion products, such as long sleeve, short sleeve, v-neck, round neck, broken. The number of lists m and n in the two vectors are determined based on a pre-generated name table or keywords table, where the name table includes a list of m categories and a list of n attributes. Therefore, when the category name list or the attribute name list is updated to include more items, the category and attribute vectors are initialized to include more dimensions corresponding to the number of words in the lists. In this way, it is easy to expand the number of different categories and attributes, and to initialize the category and attributes vectors accordingly. Thus, the text-to-vector converter according to certain embodiments of the present invention is expandable and is advantages over non-expandable converters. At this time, both $Y\_c$ and $Y\_a$ are initialized as empty because there is no input from the text. In other words, $Y\_c=(0, 0, 0, \ldots, 0)$ and $Y\_a=(0, 0, 0, \ldots, 0)$, where m number of dimensions of $Y\_c$ each have a value of 0, and n number of dimensions of $Y\_a$ each have a value of 0.

Then at procedure 220, the computing device splits the text into sentences. The texts may be an article or several paragraphs of text. In certain embodiments, the splitting of the text is based on both punctuation and length of each splits. The punctuations used for splitting the text includes period, coma, colon, semicolon, exclamation mark, question mark, multiple continuous spaces, parenthesis, dash, etc. When the text is split, each split part is further evaluated by word length. In certain embodiments, a split part equals to or greater than five words is regarded as a sentence, and a split part less than five words isn't regarded as a sentence and will be discarded. By this method, the processing of the text is fast by removing trivial split parts that are less than five words, which are normally not related to fashion. In other embodiments, the method may not include evaluating the split part by length, and all the split parts are regarded as sentences to have broad coverage of all the words in the text. In certain embodiments, the text is split using a sentence splitter, such as openNLP, NLTK.

After splitting the text into sentences, at procedure 230, the computing device further splits each sentence into multiple words, for example, using spaces.

Because a lot of high frequency words are not related to category or attributes of the fashion product, in order to improve efficiency, at procedure 240, the computing device filters those words out. The filtered words may include, among other things, "the," "be," "a," "not," "I," "he," "she," "that," "it," "to," "for," "with," "of," "and," "in," "on," "dear," "awesome," "ace," "brilliant," "beautiful," "weather," etc. By this filtering procedure, the number of words to be treated is much less.

Then at procedure 250, the computing device processes each of the filtered words in the sentence by comparing the filtered word against the categories and attributes in the name table. For each word, the computing device uses a pre-trained word to vector model (Word2vec) to convert the word into a word vector. For the purpose of comparison, the computing device also uses the Word2vector to convert the categories and attributes in the name table or keywords table to reference category vectors and reference attribute vectors. Then the computing device compare the word vector to the reference category vectors and the reference attribute vectors, and find the closest match. The computing device calculates a similarity score between the word vector and the matched reference vector (either a reference category vector or a reference attribute vector). In certain embodiments, the complete match between the word vector and the reference vector in the vector space is defined as a similarity score of 1, a non-match or remote match in the vector space is defined as a similarity of 0, and when the similarity score equals to or greater than a threshold, the match is confirmed. In certain embodiments, the threshold is set in a range of 0.5-0.9. In certain embodiments, the threshold is set in a range of 0.75-0.85. In one embodiment, the threshold is set at 0.8.

After finding matches for the word vector, at procedure 260, the computing device updates the category vector $Y\_c$ or the attribute vector $Y\_a$, depending on whether the word vector matches the reference category vector or the reference attribute vector. Specifically, one dimension in the category vector $Y\_c$ or the attribute vector $Y\_a$, corresponding to the matched reference category vector or the reference attribute vector, is set as 1. After updating the category vector $Y\_c$ or the attribute vector $Y\_a$ when the similarity equals to or is greater than the threshold, or without updating the category vector $Y\_c$ or the attribute vector $Y\_a$ when the similarity is less than the threshold, the computing device continues to process the next word in the sentence.

At procedure 270, the computing device repeats the procedure 230-260 for each of the sentences. That is, the computing device processes all words in one sentence, and after processing all the words in one sentence, processes the next sentence. When all the sentences have been processed, the final category vector and attribute vector is obtained. For example, if the text of the fashion entry includes "broken jeans" which are fashion related, the first dimension of the category vector corresponds to jeans, and the third dimension of the attribute vector corresponds to broken, then the final category vector is $Y\_c=(1, 0, 0, \ldots, 0)$, and the final attribute vector is $Y\_a=(0, 0, 1, \ldots, 0)$.

Kindly notes that the method of processing the text is not limited to the one shown in FIG. 2, and other reasonable variations are included. For example, the computing device may split the whole text directly into words, and processes the words. The frequency of the words may be considered and used as a weight in the comparison, where high frequency of the words makes the similarity value slightly higher. The text processing method according to certain embodiments of the present invention separates the category characters and attribute characters into two vectors. Each of the category vector and the attribute vector has multiple dimensions, and the dimensions of the category vector and the dimensions of the attribute vector have a many-to-many relationship. The many-to-many relationships multiply the possibilities the two vectors can define. Further, the name table (or keyword table) includes the category name list and the attribute name list, and the dimensions of the category vector and the dimensions of the attribute vector can be determined based on the category name list and the attribute name list. Therefore, by simply updating the category name list and the attribute name list, the dimensions of the category vector and the dimensions of the attribute vector can be expanded automatically. This provides an expandable data structure that is not available in a common Word2vec method. In certain embodiments, automatically adding of attribute is available, and the process is as follows: when a new word in a text is determined to be not the same but repeats many times (the number of the word occurrence is larger than threshold) within different sentences, the new word may be added to the category list or the attribute list accordingly automatically.

Figure 3:
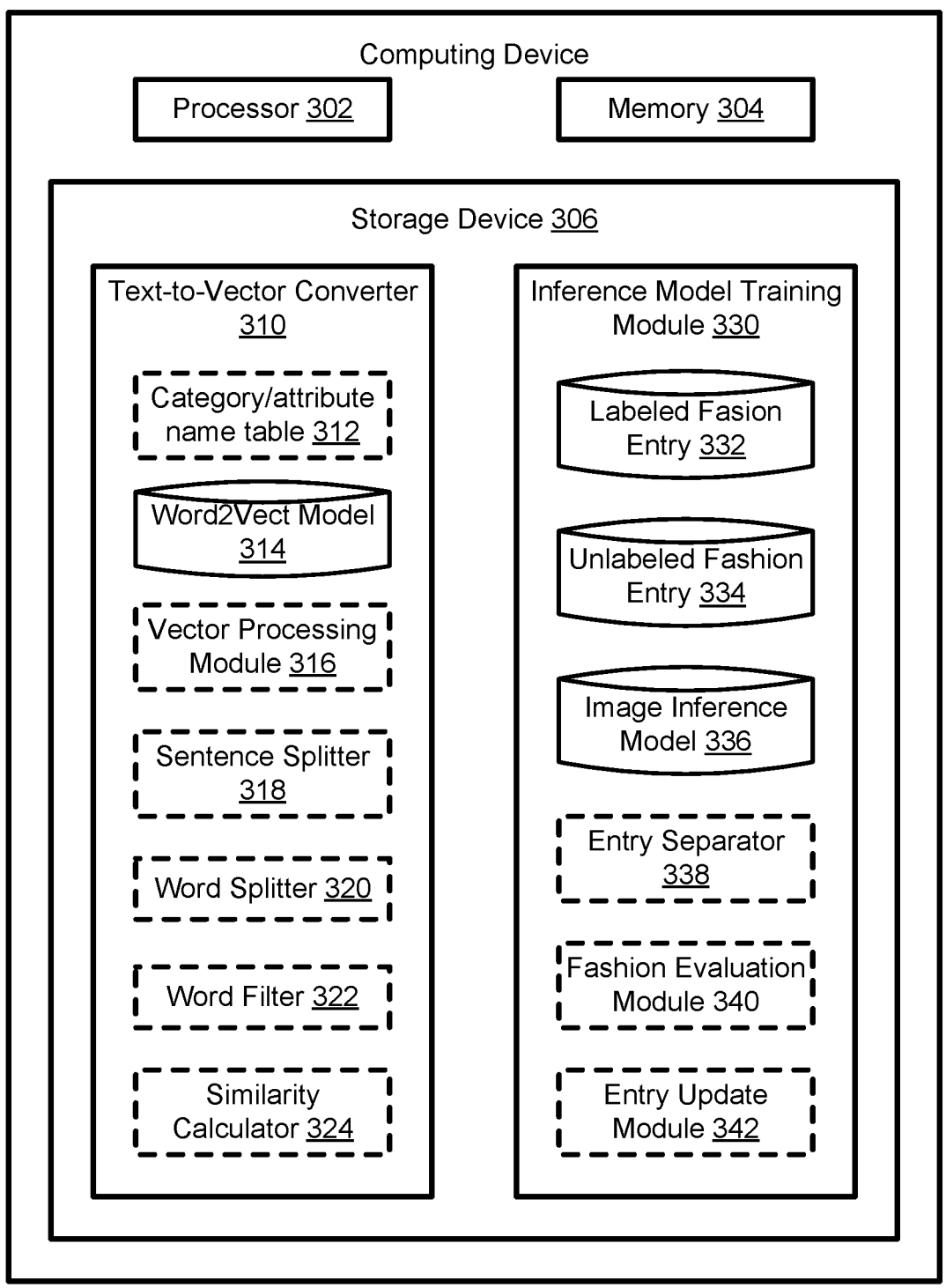
FIG. 3 schematically depicts an exemplary computing device according to certain embodiments of the present invention.

FIG. 3 schematically depicts an exemplary computing device according to certain embodiments of the present invention. In certain embodiments, the computing device can be used to implement the methods shown in FIG. 1 and FIG. 2. In certain embodiments, the computing device 300 shown in FIG. 3 may be a server computer, a cluster, a cloud computer, a general-purpose computer, a headless computer, or a specialized computer, which provide services to evaluate fashion products. As shown in FIG. 3, the computing device 300 may include, without being limited to, a processor 302, a memory 304, and a storage device 306. In certain embodiments, the computing device 300 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 302 may be a central processing unit (CPU) which is configured to control operation of the computing device 300. The processor 302 can execute an operating system (OS) or other applications of the computing device 300. In some embodiments, the computing device 300 may have more than one CPU as the processor, such as two CPUs, four CPUs, eight CPUs, or any suitable number of CPUs.

The memory 304 can be a volatile memory, such as the random-access memory (RAM), for storing the data and information during the operation of the computing device 300. In certain embodiments, the memory 304 may be a volatile memory array. In certain embodiments, the computing device 300 may run on more than one memory 304.

The storage device 306 is a non-volatile data storage media for storing the OS (not shown) and other applications of the computing device 300. Examples of the storage device 106 may include non-volatile memory such as flash memory, memory cards, USB drives, hard drives, floppy disks, optical drives, or any other types of data storage devices. In certain embodiments, the computing device 300 may have multiple storage devices 306, which may be identical storage devices or different types of storage devices, and the applications of the computing device 300 may be stored in one or more of the storage devices 306 of the computing device 300. The storage device 306 includes, among other things, a text-to-vector converter 310 and an inference model training module 330. The text-to-converter 310 includes a category/attribute name table 312, a word2vect model 314, a vector processing module 316, a sentence splitter 318, a word splitter 320, a word filter 322, and a similarity calculator 324. The inference model training module 330 includes labeled fashion entries 332, unlabeled fashion entries 334, an image inference model 336, an entry separator 338, a fashion evaluation module 340, and an entry update module 342. In certain embodiments, the storage device 306 may include other applications or modules necessary for the operation of the text-to-vector converter 310 and the inference model training module 330. It should be noted that the modules 310, 330 and their submodules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code.

The text-vector converter 310 is configured to, in response to receiving text of a fashion entry, that is, information about a fashion product, generate a category vector and an attribute vector of the text. Each of the category vector and the attribute vector is a vector, an array list, or a linked list. In certain embodiments, the category vector is denoted as $Y\_c=(C_1, C_2, C_3, \ldots, C_m)$, where each of $C_1, C_2, C_3, \ldots, C_m$ represents a dimension of the vector $Y\_c$. Each of the dimensions corresponds to one of the categories of fashion products, such as jeans, jacket, dresses, etc. The number of dimensions of the category vector $Y\_c$ depends on how many categories are defined, and in certain embodiments the number of dimensions of the vector $Y\_c$ is about 100. In certain embodiments, by running the text-vector converter 310, dimensions of the category vector $Y\_c$ can be increased automatically or manually. In certain embodiments, the value of the dimensions of $Y\_c$ is 0 and 1, where 0 means the corresponding dimension doesn't exist in the target text, while 1 means the corresponding dimension exists in the target text. For example, if $C_1$ correspond to "jeans," and $Y\_c=(1, 0, 0, \ldots, 0)$, then the text includes the word "jeans" or the word that has high similarity to jeans.

Similarly, in certain embodiments, the attribute vector is denoted as $Y\_a=(A_1, A_2, A_3, \ldots, A_n)$, where each of $A_1, A_2, A_3, \ldots, A_n$ represents a dimension of the vector $Y\_a$. Each of the dimensions corresponds to one of the attributes of the fashion products, such as long sleeve, short sleeve, broken, etc. The number of dimensions of the attribute vector $Y\_a$ depends on how many attributes are defined, and in certain embodiments the number of dimensions of the vector $Y\_a$ is about 30. In certain embodiments, by running the text-vector converter 310, dimensions of the attribute vector $Y\_a$ can be increased automatically or manually. In certain embodiments, the value of the dimensions of $Y\_a$ is 0 and 1, where 0 means the corresponding dimension doesn't exist in the target text, while 1 means the corresponding dimension exists in the target text. For example, if $A_3$ correspond to "broken," and $Y\_a=(0, 0, 1, \ldots, 0)$, then the text includes the word "broken" or the word that has high similarity to broken. Combining the information in $Y\_c$ and $Y\_a$, suppose $Y\_c=(1, 0, 0, \ldots, 0)$ and $Y\_a=(0, 0, 1, \ldots, 0)$, we know that the text relates to broken jeans.

The text-vector converter 310 performs its function through the category/attribute name table 312, the word2vect model 314, the vector processing module 316, the sentence splitter 318, the word splitter 320, the word filter 322, and the similarity calculator 324.

The category/attribute name table 312 includes a category name list and an attribute name list of fashion products, where the category name list includes category names of the fashion products, such as jeans, jacket, dresses, and the attribute name list includes attribute names of the fashion products, such as long sleeve, short sleeve, broken, etc. In certain embodiments, the category/attribute name table 312 provides the lists to the vector processing module 316 to initialize the category vector Y_c and the attribute vector Y_a, where the initialized vector Y_c and vector Y_a have the number of dimensions respectively corresponding to the number of categories and the number of attributes in the category name list and the attribute name list. In certain embodiments, the category name list and the attribute name list can be automatically or manually updated. For example, when a new word in a text is determined to be not the same but similar to an old word listed in the category list or the attribute list, the new word may be added to the category list or the attribute list accordingly automatically. In other embodiments, a user interface may be provided to list the category name list and the attribute name list, and a user can add a new category to the category name list or add a new attribute to the attribute name list through the user interface.

The word2vect model 314 is configured to receive a word in fashion, and generate a vector in a vector space for the word. In certain embodiments, the word2vect model is a shallow, two-layer neural network that is trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in proximity to one another in the space. In certain embodiments, the word2vector model 314 is pre-trained using fashion products related entries, such that the model provides meaningful and accurate information of the words in the fashion field. In certain embodiments, the words may be input from the category/attribute name table 312. The word2vect model 314 may use the category name list and attribute name list in the category name table 312, correspondingly generate category name vectors and attribute name vectors, and save the generated category name vectors and the attribute name vectors in the category name table 312. Under this situation, whenever the category name list or the attribute name list is updated, word2vect model 314 may run the above process again to update the category name vectors and the attribute name vectors. In certain embodiments, the word2vect model 314 may, in response to receiving the instruction for comparison from the similarity calculator 324, use the category name list and attribute name list in the category name table 312 to generate category name vectors and attribute name vectors, and provide the generated category name vector and attribute name vectors to the similarity calculator 324 for comparison. In certain embodiments, the word may be input from the similarity calculator 324, and the word2vect model 314 generate a corresponding word vector corresponding to the word, and send the word vector to the similarity calculator 324 for comparison. In certain embodiments, the word2vect model 314 may be retrained using the catalog/attribute name table after the catalog name list and the vector name list are increased.

The vector processing module 316 is configured to initialize category vector and attribute vector for a text, and update the category vector and the attribute vector in response to receiving a similarity score of a word from the similarity calculator 324, where the word is contained in the text. Specifically, when the text-to-vector converter 310 receives a new text, the category vector Y_c and the attribute vector Y_a are initialized. For the initialization, the vector processing module 316 first retrieve a number of categories and a number of attributes from the category/attribute name table 312. The number of categories and the number of attributes may be parameters stored in the category/attribute name table 312. In certain embodiments, if the number of categories and the number of attributes are not available in the category/attribute name table 312, the vector processing module 316 may also count the numbers based on the category name list and the attribute name list stored in the category/attribute name table 312. With m number of categories and n number of attributes available, the category vector Y_c is initialized with m dimensions, and each dimension is set with a value 0, and the attributes vector Y_a is initialized with n dimensions, and each dimension is set with a value 0.

The vector processing module 316 is further configured to update the initialized category vector Y_c and the attribute vector Y_a. When a word is processed by the similarity calculator 324, the corresponding word vector may not match any of the category name vectors or attribute name vectors, and no updates is needed. When the word vector matches the ith category name vector, the similarity calculator 324 sends the matching information to the vector processing module 316. In response to receiving the matching information of the ith category name vector, the vector processing module 316 update the ith dimension of the category vector Y_c to the value of 1, that is, Y_c[i]=1. When the word vector matches the jth attribute name vector, the similarity calculator 324 sends the matching information to the vector processing module 316. In response to receiving the matching information of the jth attribute name vector, the vector processing module 316 update the jth dimension of the attribute vector Y_a to the value of 1, that is, Y_a[j]=1. In rare conditions, the word vector matches both a category name vector and an attribute name vector, the vector processing module 316 may correspondingly update both the category vector Y_c and the attribute vector Y_a.

The sentence splitter 318 is configured to split the text into multiple sentences. In certain embodiments, the splitting of the text is based on both punctuation and length of each splits as described above. The punctuations include period, coma, colon, semicolon, exclamation mark, question mark, multiple continuous spaces, parenthesis, dash, etc. The length of the sentence may be set, for example, to be no less than five words. That is, a sentence must have five or more words. In certain embodiments, the text is split using a sentence splitter, such as openNLP, NLTK. The sentence splitter 318 then sends the split sentences to the word splitter 320, for example, one by one or by batch.

The word splitter 320 is configured to, in response to receiving a sentence from the sentence splitter 318, split the sentence into words. In certain embodiments, the word splitter 320 splits the sentence using the spaces in the sentence. After that, the word splitter 320 is configured to sends the words to the word filter 322.

The word filter 322 is configured to, in response to receiving the words of the sentence, filter the obtained words to remove non-meaning words. Here non-meaning words refer to the words that are not related to features of fashion products. In certain embodiments, the word filter 322 filters the words using a list, and the words in the list are removed from further processing. In certain embodiments, the word list for filtering includes "the," "be," "a," "not," "I," "he," "she," "that," "it," "to," "for," "with," "of," "and," "in," "on," "dear," "awesome," "ace," "brilliant," "beautiful," "weather," etc. The word filter 322 is configured to send the filtered words to the similarity calculator 324.

The similarity calculator 324 is configured to, in response to receiving a filtered word from the word filter 322, comparing the filtered word with the catalog name list and the attribute name list stored in the category/attribute name table 312, so as to get a score of the comparison. In certain embodiments, before the comparison, the similarity calculator 324 is configured to send the filtered word to the word2vect model 314, so as to obtain a new word vector from the word2vect model 314 that corresponds to the filtered word. The category/attribute name table 312 has the reference category vectors and the reference attribute vectors. The similarity calculator 324 compares the similarity between the new word vector and the reference category vectors and the reference attribute vectors, and find the best match of the vectors in the vector space. The similarity between the new word vector and the matched reference vector (either a reference category vector or a reference attribute vector) is defined by a score between 0 and 1, where 0 indicates no match at all, and 1 indicates exact match of two vectors. When the score between the new word vector and its matched vector equals to or is greater than a threshold value, the two vectors are matched. In certain embodiments, the threshold is in a range from 0.3-1.0. In certain embodiments, the threshold is in a range from 0.5-0.9. In one embodiment, the threshold is set at 0.8. After obtaining the score, the similarity calculator 324 is configured to send the score and the corresponding filtered word, or the new word vector and the matched word or the matched reference vector to the vector processing module 316, such that the vector processing module 316 can use the information to update at least one of the category vector $Y\_c$ and the category vector $Y\_a$ corresponding to the text.

The inference model training module 330 is configured to pre-train the image inference model 336 using the labeled fashion entry 332, analyzing the unlabeled fashion entry 334 using the image inference model 336 and the text-to-vector converter 310, and retrain the image inference model 336 using the analyzing result of the unlabeled fashion entry 334.

The labeled fashion entry 332 includes images of fashion products and labels of the images. The labels includes category of fashion product in the image and optionally attributes of the fashion product. In certain embodiments, an image may include both fashion product and non-fashion object, and the non-fashion objects are labeled with empty labels. The empty labels may be a "space," a "0," a word "empty" or "non-fashion." In certain embodiments, the images in the labeled fashion entry 332 is manually labeled by a user or semi-automatically labeled with limited supervision of the user. In certain embodiments, because the design of the inference model training module 330 makes it capable of improving the image inference model 336 by self-learning, the labeled fashion entry 332 don't need to include a large number of labeled entries at the beginning. In certain embodiments, an initial small-scale training data of about 2000 entries is sufficient for the initial training of the image inference model 336. In certain embodiments, the initial training meets requirement when the recognition rate of the labeled fashion entries is over 95%.

The unlabeled fashion entry 334 includes entries of candidate fashion products for processing. Different from entries in the labeled fashion entry 332, the entries in the unlabeled fashion entry 334 include both images and text, those images and text may be raw data that are not labeled. For example, an entry in the unlabeled fashion entry 334 may be an advertorial, which includes an image of a fashion product, and text that describe the fashion product.

The image inference model 336 is configured to analyze an image to infer fashion features from the image. In certain embodiments, the image inference model 336 is a CNN model. The image inference model 336 can be trained using the labeled images from the labeled fashion entry 332, and can be used to analyze images of unlabeled entries from the unlabeled fashion entry 332. In certain embodiments, the image inference model 336 or the CNN model consists multiple hidden layers as well as one input and output layer. The hidden layers consist of convolutional layers, activation layer, pooling layers, fully connected layers and normalization layers. The image RGB data is fed into input layer, then the convolution layer extracts high-level features with pooling layers and normalization layers. Finally, the fully connect layers transfer the feature into target class vector. The activation layers generate category label from class vector.

The entry separator 338 is configured to retrieve or receive an entry from the unlabeled fashion entry 334, and separate the entry into text and an image. The entry separator 338 then sends the text to the text-to-vector converter 310 and sends the image to the image inference model 336.

As described above, an entry from the unlabeled fashion entry 334 includes an image and text. The entry separator 338 receives or retrieves the entry from the unlabeled fashion entry 334, and separates the entry into the image and the text. The entry separator 338 sends the image to the image inference model 336, such that the image inference model 336 analyzes the image to obtain labeled image, and send the labeled image to the entry evaluation module 340. The entry separator 338 also sends the text to the text-to-vector converter 310, such that the text-to-vector converter 310 processes the text to obtain a category vector and an attribute vector, and sends the vectors to the entry evaluation module 340.

The entry evaluation module 340 is configured to, upon receiving the category vector and the attribute vector from the text-to-vector converter 310 and the labeled image form the image inference model 336, evaluate the results. First, the entry evaluation module 340 determines if the text is fashion related by determining the sum of the value of the category vector $Y\_c$ and the attribute vector $Y\_a$. When the sum of the value is less than 1, or $Y\_c=(0, 0, 0, \ldots, 0)$ and $Y\_a=(0, 0, 0, \ldots, 0)$, the entry is determined to be not fashion related. Accordingly, the entry evaluation module 340 defines the label of the labeled image as empty, and output the image and the empty label(s) to the entry update module 342. The entry update module 342 accordingly updates the labeled fashion entry 332 with the image and the empty label. Because the labels are empty, the image are used as negative entries.

Second, when the value of the category vector $Y\_c$ and the attribute vector $Y\_a$ is greater than 1, the entry evaluation module 340 extracts the features corresponding to the value. For example, if the first dimension of $Y\_c$ is "jeans," and $Y\_c=(1, 0, 0, \ldots, 0)$, then the feature "jeans" is extracted from the vector $Y\_c$. If the third dimension of $Y\_a$ is "broken", and $Y\_a=(0, 0, 1, \ldots, 0)$, then the feature "broken" is extracted from the vector $Y\_c$. The extracted feature "jeans" (and optionally "broken") is then matched to the labels of the image obtained from the image inference model 336. When the category feature "jeans" from $Y\_c$ matches the "jeans" feature from the label(s) of the image, the fashion evaluation module 340 define the label of the image with both the feature "jeans" and the feature "broken," and sends the images and the updated label to the entry update module 342. The entry update module 342 subsequently updates the labeled fashion entry 332, where the added entry includes the image and the labels of "jeans" and "broken." The labels are split into category word and attribute word.

Third, if the category feature extracted from the text doesn't match the labels extracted from the image by the image inference model 336, the fashion evaluation module 340 may discard the entry or present the result of the analysis to a user, such that the user can define the category (and optionally attribute) of the entry manually, send the defined label and the image to the entry update module 342, such that the entry update module 342 can update the labeled fashion entry 332 with the new entry. The new entry includes the image and the manually added labels to the image.

By the design of the above text-to-vector converter 310 and the image inference model training model 330, certain embodiments of the present invention is able to combine both the information from the text and the image of an entry to train the image inference model 336, and update the training data automatically or with very less supervision by the user. Accordingly, the training of the image inference model 336 doesn't requires a large number of labeled entries. Further, the training process is able to add attributes, which is not available in the initializing labeled fashion entry 332, to the labeled fashion entry 332. Therefore, the process is easily expandable by adding new attributes and sometimes new category to the labeled fashion entry 332.

Once the labeled fashion entry 332 is updated for a certain period of time or is updated with certain number of new entries, the inference model training module 310 may retrain the image inference model 336 with the updated labeled fashion entry 332.

Figure 4:
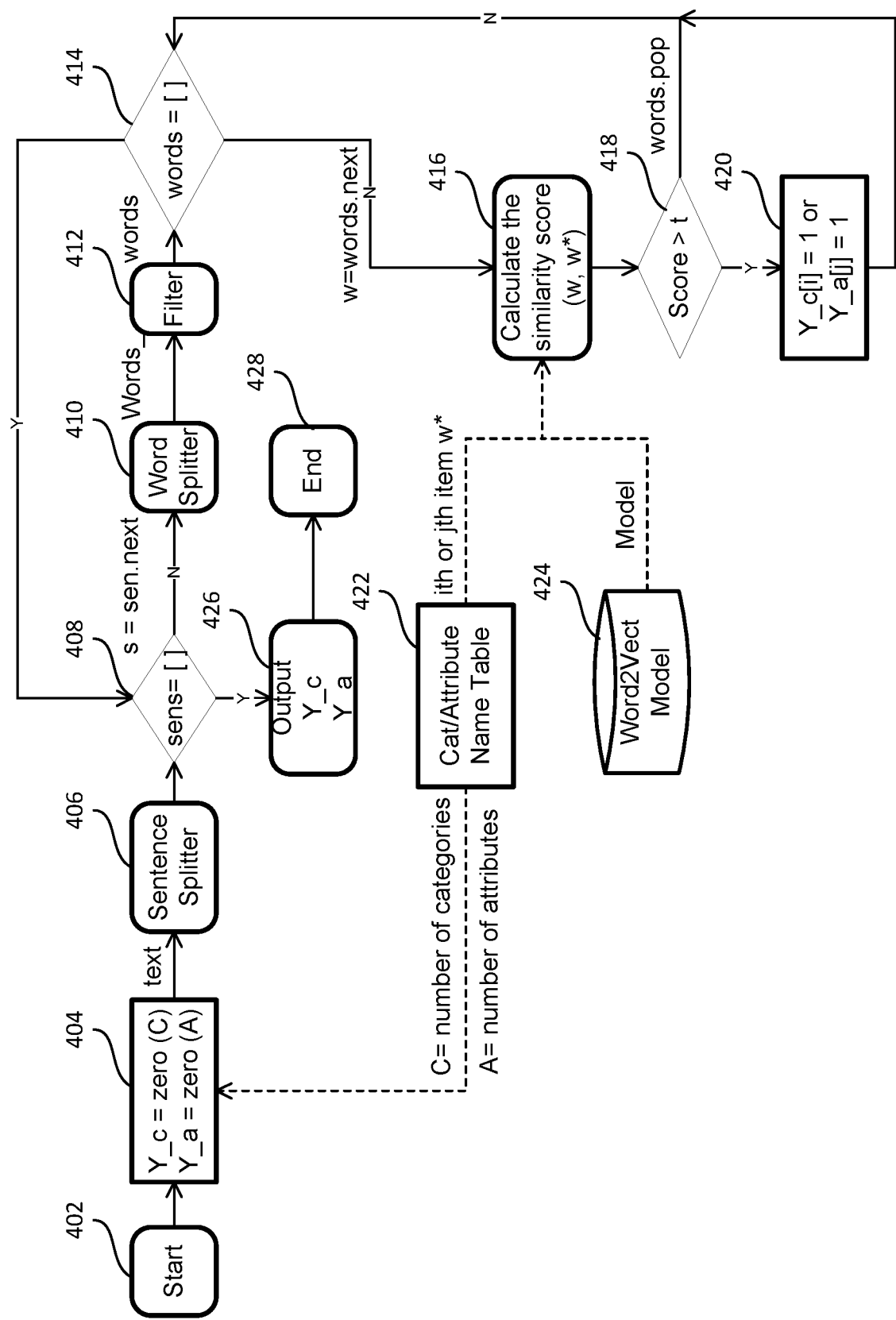
FIG. 4 schematically depicts an exemplary process of processing text of a fashion product according to certain embodiments of the present invention.

FIG. 4 schematically shows an example according to certain embodiments of the present invention. The example schematically shows how to process a text to obtain a category vector and an attribute vector. In certain embodiments, the example is performed by a computing device, such as the computing device 300 shown in FIG. 3.

When a text is provided, the process starts as indicated by 402. When the process starts, as shown by 404, the category vector Y_c and the attribute vector Y_a are initialized to respectively have "C" number of dimensions and "A" number of dimensions. "C" and "A" can be calculated from the cat/Attribute name table 422. Specifically, the category/attribute name table 422 includes a category list and an attribute list. The category list includes category names of fashion products, such as "jeans," "jacket," "dresses," and the number of categories in the category list is "C." The attribute list includes attributes of fashion products, such as "long sleeve," "short sleeve," "broken," and the number of attributes in the attribute list is "A." Because the category/attribute name table is expandable, the number of categories and the number of attributes may vary from one time to another time. Therefore, the initialization can obtain the numbers "C" and "C" based on the current number of categories and attributes in the category/attribute name table.

When the Y_c and Y_a are initialized, the text is sent into a sentence splitter 406. The sentence splitter 406 splits the text, such as an article or a paragraph in a magazine or a website, into sentences or split parts. The split may be performed by the computing device using for example certain punctuations, line breaks, and page breaks. In certain embodiments, the computing device further evaluate whether the split parts are real sentence by counting the number of words. If the number of words in a split part is less than five words, that split part is not regarded as a sentence and will be discarded.

The computing device then processes the sentences one by one. The function 408, i.e. sens=[ ], determines whether there the sentences have been completely processed. If not, the next sentence (or the first sentence at the beginning) is sent to word splitter 410. If all the sentences have been processed, the computing device output Y_c and Y_a at 426, and ends the process at 428.

The word splitter 410, upon receiving a sentence, split the sentence into words. The splitting may be based on space between the words in the sentence.

When the sentence is split into separated words, the words may be filtered by the filter 412, so as to remove non-meaning words or words that are completely non-related with fashion.

After filtering, the words are processed one by one by 414, 416, 418 and optionally 420 one by one. The function words=[ ] at 414 determines if all the filtered words from the same sentence have been completely processed. If so, the process goes to 408 to process the next sentence. If not, the w=words.next picks up the next word (or the first word at the beginning), and at process 416, the computing device calculates the similarity score between the picked word "w" and a corresponding matching word "w*." For calculating the similarity score, both the word "w" and the word "w*" are converted to vectors by the word2vect model 424. Specifically, the word2vector model 424 convert the word "w" to a vector as target vector, and convert the category names and attribute names in the cat/attribute name table 422 to vectors as reference vectors, and calculate the similarity between the target vector and the reference vectors in the vector space. Suppose the most matched reference vector corresponds to the word "w*," then the similarity is defined as the similarity between the vector of "w" and the vector of "w*." The exact match is defined as 1, and the no match at all is defined as 0, and the similarity between the vectors "w" and "w*" is a score or value between 0 and 1. In certain embodiments, the value may also be indicated in other suitable ranges instead of between 0 and 1.

A score threshold "t" is predetermined, and the similarity score between the vectors of "w" and "w*" is compared with the threshold t at procedure 418. When the similarity score is greater than t, at procedure 420, the computing device defines the ith dimension of the vector Y_c to the value 1 when the word "w*" corresponds to the ith dimension of Y_c; or the computing device defines the jth dimension of the vector Y_a to the value 1 when the word "w*" corresponds to the jth dimension of the vector Y_a. Then the computing device goes to the function words=[ ] at procedure 414 to repeat the process on the next word.

When the similarity score equals to or less than the threshold t, the computing device doesn't update the vectors Y_c and Y_a, and goes to the function words=[ ] at procedure 414 to repeat the process on the next word.

When all the words in one of the sentences have been processed in the procedures 414-418 and optionally 420, the computing devices goes to the procedure 408 to repeat the process on the next sentence. By repeating the process on the sentences and words, the category vector Y_c and the attribute vector Y_a are updated.

When all the sentences have been processed, the computing device output the category vector Y_c and the attribute vector Y_a at procedure 426, and the process end here at 428. Specifically, the output Y_c and Y_a can be sent to the process shown in FIG. 5 for further analysis.

Figure 5:
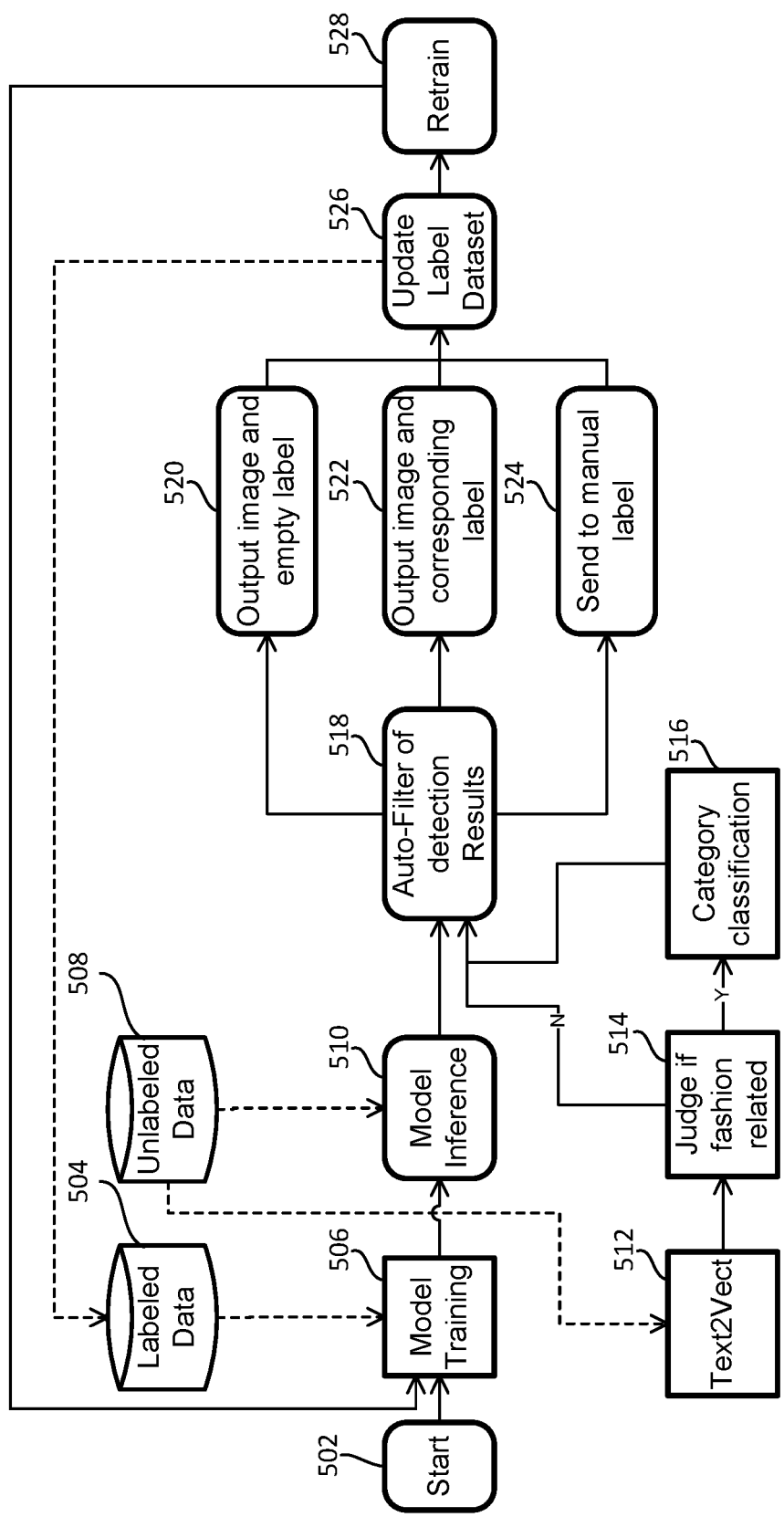
FIG. 5 schematically depicts an exemplary process of processing text and image of a fashion product according to certain embodiments of the present invention.

FIG. 5 schematically shows an example according to certain embodiments of the present invention. The example schematically shows how to train an image inference model using image information and text information of an entry of a fashion product, and considering the relationship between the image information and the text information. In certain embodiments, the example is performed by a computing device, such as the computing device 300 shown in FIG. 3.

As shown in FIG. 5, when the training starts at 502, firstly, the labeled data 504 is used to train an image inference model at procedure 506. The labeled data 504 includes a plurality of entries, each entry includes an image and a label of the images. The images and the labels are fashion related. In certain embodiments, the labeled data 504 also includes negative entries which are not fashion related. Because the self-learning capability of the system shown in FIG. 5, it is not required to have a large pool of labeled data. In certain embodiments, the number of initial small-scale training data is about 2000. The image inference model may use a Fast Region-based Convolution (Fast R-CNN), a you only look once (YOLO), or a single shot multibox detector (SSD) training model. In one example, Fast R-CNN is used. The model training 506 is regarded as completed when the image inference model recognizes the training data at a rate of 95% or more.

When the image inference model is well trained, it can be used to analyze unlabeled data. In certain embodiments, for an entry stored in the unlabeled data 508, the computing device retrieves one entry, and separates the entry into an image and text. The image is sent to the image inference model at step 510 to infer bounding boxes and labels from the image, and the text is sent to the text2vect converter at step 512 to generate a category vector and an attribute vector. In certain embodiments, the generation of the category vector and the attribute vector is as shown in FIG. 4. In certain embodiments, for the image, the image inference model may provide several bounding boxes and their corresponding labels, or one label for the whole image.

The computing device then combine the analyzing result on the image obtained from the image inference model, and the analyzing result on the text obtained from the tect2vect converter. Firstly, at step 514, the computing device judges if the text is fashion related. Specifically, if the sum of the category vector and the attribute vector equals to or greater than 1, that is, at least one dimension of the category vector or at least one dimension of the attribute vector is 1, the text is determined to be fashion related, and the process goes to step 516. If all the dimensions of $Y\_c$ and $Y\_a$ are 0, then the entry is not fashion related, and the process goes to step 518. In certain embodiments, for determining that an entry is fashion related, $Y\_c$ should be greater than 0.

When the sum of $Y\_c$ and $Y\_a$ are 1 or more, at step 516, the dimensions of $Y\_c$ and $Y\_a$ having the value of 1 are extracted, and the extracted dimension from $Y\_c$ is matched to different areas. Then the process proceeds to the step 518. In certain embodiments, we at first get the index of $Y\_c$ where the value equal to 1. Then we can get the category label word by get the value from reference category word table with same index location. For example, if $Y[1]=1$ ($Y[0]=0$), and the category table list is ['t-shirt', 'dress shirt' . . .], we can get the word 'dress shirt'. Meanwhile, the inference model will also give the category name for each bounding box. So, we can match by seeing if the category names are same.

At step 518, the computing device automatically filters the detection results based on the model inference obtained at step 510, the judgement obtained at step 514, and optionally the extracted category and attribute and match of the extracted category to the bounding box labels. When the judgement at step 514 is not fashion related, then the computing device defines the labels of the bounding boxes as empty, and at procedure 520, outputs the image, the bounding boxes, the location of the bounding boxes, and the empty labels. When the judgement at step 514 is fashion related, and the extracted positive dimension in $Y\_c$ matches the label of the bounding box from the image inference model, the computing device defines the labels of the bounding boxes to include both the positive dimension in $Y\_c$, and the positive dimension in $Y\_a$, and output the image, the bounding boxes, the locations of the bounding boxes, and the corresponding labels. Here the labels include category information, and optionally the attribute information (when the positive dimension in $Y\_a$ is available). When the judgement at step 514 is fashion related, and the extracted positive dimension in $Y\_c$ does not match the label of the bounding box from the image inference model, the computing device may discard the information, or alternatively as shown in step 524, provide a user interface for a user to input the label of the bounding boxes manually, where the label include category information and optionally attribute information of the fashion product in this entry.

Once the step 520, or 522, or 544 is performed, at step 526, the computing device update the labeled data using the result from steps 520, 522, or 524. Specifically, if the result is an image with bounding boxes and empty labels as shown in step 520, the new entry will be used as negative entry. If the result is an image with bounding boxes and labels, which includes category labels and optionally attribute labels, as shown in step 522, the new entry will be used as positive entry. If the result is an image with bounding boxes and labels, which may be empty labels or positive labels (category labels, and optionally attribute labels), as shown in step 524, the new entry will be used as negative or positive entry. In certain embodiments, the method updates the labeled data by adding one bounding box of the image and its corresponding label, or by adding the whole image and the label.

After analyzing a number of entries from the unlabeled data 508, or after a predetermined time of the analyzing of entries from the unlabeled data 508, the number of entries in the labeled data 504 is significantly increased. Then at step 528, the image inference model may be retrained using the unlabeled data 504 that has more entries. Because the number of entries in the unlabeled data 504 is increased, the training of the image inference model is more efficient, and the trained image inference model is more reliable. In certain embodiments, the number of entries in the labeled data can be thousands or millions. Therefore, although the number of initial labeled entries in the labeled data 504 is small and does not require much user inputs, the final image inference model can be trained automatically using a large number of unlabeled data, to efficiently improve the reliability of the image inference model.

In certain aspects, the present invention relates to a non-transitory computer readable medium storing computer executable code. In certain embodiments, the computer executable code may be the software stored in the storage device 306 as described above. The computer executable code, when being executed, may perform one of the methods described above. In certain embodiments, the non-transitory computer readable medium may include, but not limited to, the storage device 306 of the computing device 300 as described above, or any other storage media of the computing device 300.

In certain aspect, the present invention relates to the use of the image inference model after sufficient training, so as to standardize fashion entries obtained from a seller, a merchant, an article, etc. In certain embodiments, the standardized fashion entries are shown to a buyer in an e-commerce platform, such that the buyer can easily find related fashion products based on the standardized features.

Certain embodiments of the present invention, among other things, have the following beneficial advantages: (1) The categories and the attributes of fashion products are represented by two vectors, and the many-to-many relationship between the categories and the attributes provides flexibility of expanding the categories and the attributes. When comparing with define categories and define certain attributes under some of the categories, the system and method defined by the present invention is much more easy and efficient. (2) The training of the image inference model utilizes both the fashion feature from the image and fashion feature form the text, which enables the image inference model to process fashion product information accurately. (3) The training method provided by the present invention only requires a small-scale labeled data, but the complete training of the image inference model can use a large amount of unlabeled fashion data.

In certain aspects, the present disclosure is not limited to fashion entries, but can be extended to other entries that have image content and text content. The training entries may be labeled by a variety of categories, and have attributes that are not easily recognized by human. The categories may be defined as a coarse classification of the entries, while the attributes may be defined as subtle features of the entries. The starting labels of the training entries are categories of the training entries. When a new entry is inputted in the system, as described above, the entry is separated to image and text. The image is processed by the inference model, which gives a category label of the entry, while the text-to-vector converts the text to category vector and attribute vector. When the category indicated by the label and the category indicated by the category vector match, both the category and the attribute from the attribute vector are added as the label of the entry. After rounds of training, the label of the entries not only includes their respective category information, but also include newly learned attributes information. By the above procedures, the disclosure provides an unsupervised mechanism that can add attributes, that is, fine features, to the entries.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCES

1. Ren, Shaoqing, et al., Faster R-CNN: Towards real-time object detection with region proposal networks, Advances in neural information processing systems, 2015.
2. Dong, Jianfeng, Xirong Li, and Cees G M Snoek, Predicting Visual Features from Text for Image and Video Caption Retrieval, arXiv:1709.01362, 2018.
3. Dong, Hao, et al., I2T2I: Learning Text to Image Synthesis with Textual Data Augmentation, arXiv: 1703.06676, 2017.

What is claimed is:

1. A method for training an inference model using a computing device, comprising:
   providing a text-to-vector converter;
   providing the inference model and pre-training the inference model using a first number of labeled fashion entries;
   providing a second number of fashion entries, wherein the fashion entries are not labeled;
   separating each of the second number of fashion entries into a target image and target text;
   converting the target text into a category vector and an attribute vector using the text-to-vector converter, wherein the category vector comprises a plurality of dimensions corresponding to categories of fashion, and the attribute vector comprise a plurality of dimensions corresponding to attributes of fashion, wherein the converting the target text into the category vector and the attribute vector comprises:
      providing a category name list and an attribute name list, wherein the category name list comprises a word list of categories of fashion, and the attribute name list comprises a word list of attributes of fashion;
      initializing the category vector and the attribute vector;
      splitting the target text to obtain target words;
      comparing each of the target words to the category name list and the attribute name list to obtain a similarity score; and
      updating the category vector or the attribute vector when the similarity score is greater than a threshold;
   processing the target image using the inference model to obtain processed target image and target image label;
   comparing the category vector to the target image label;
   when the category vector matches the target image label, updating the target image label based on the category vector and the attribute vector to obtain updated label; and
   retraining the inference model using the processed target image and the updated label.

2. The method of claim 1, wherein the step of initializing the category vector and the attribute vector is performed by:
   defining a number of dimensions of the category vector as a number of categories in the category name list; and
   defining a number of dimensions of the attribute vector as a number of attributes in the attribute name list.

3. The method of claim 1, wherein the step of splitting the target text to obtain target words comprises:
   splitting the target text into sentences;
   splitting each of the sentences into split words; and
   removing non-fashion words from the split words to obtain the target words.

4. The method of claim 1, wherein the step of comparing each of the target words to the category name list and the attribute name list to obtain the similarity score is performed by:
   converting each of the target words into a target vector by a word-to-vector model;
   converting the category name list and the attribute name list into reference vectors using the word-to-vector model; and comparing the target vector to the reference vectors in a vector space,
wherein the word-to-vector model is pre-trained with words in fashion.

5. The method of claim 4, wherein the similarity score is defined as 1 when the target vector is the same as one of the inference vectors, the similarity score is defined as 0 when the target vector is remote to all the inference vectors, and the threshold is set at about 0.8.

6. The method of claim 1, wherein each of the labeled fashion entries comprises a label, wherein the label is a word related to a fashion feature of an image.

7. The method of claim 1, further comprising: when each dimension of the category vector has a value of 0, updating the target image label by defining the target image label as empty.

8. The method of claim 1, further comprising: when the category vector doesn't match the target image label, providing a user interface for updating the target label.

9. The method of claim 1, wherein the first number is about or less than 2000, and the second number is greater than 1 million.

10. A system for training an inference model, comprising:
a computing device, comprising a processor and a storage device storing computer executable code, wherein the computer executable code comprises a text-to-vector converter, the inference model, a first number of labeled fashion entries, and a second number of fashion entries that are not labeled, and the computer executable code, when executed at the processor, is configured to:
pre-train the inference model using the first number of labeled fashion entries;
separate each of the second number of fashion entries into a target image and target text;
convert the target text into a category vector and an attribute vector using the text-to-vector converter, wherein the category vector comprises a plurality of dimensions corresponding to categories of fashion, and the attribute vector comprises a plurality of dimensions corresponding to attributes of fashion, wherein the computer executable code, is configured to covert the target text into the category vector and the attribute vector by:
providing a category name list and an attribute name list, wherein the category name list comprises a word list of categories of fashion, and the attribute name list comprises a word list of attributes of fashion;
initializing the category vector and the attribute vector by defining a number of dimensions of the category vector as a number of categories in the category name list, and defining a number of dimensions of the attribute vector as a number of attributes in the attribute name list;

splitting the target text into sentences, splitting each of the sentences into split words, and removing non-fashion words from the split words to obtain target words;
comparing each of the target words to the category name list and the attribute name list to obtain a similarity score; and
updating the category vector or the attribute vector when the similarity score is greater than a threshold;
process the target image using the inference model to obtain processed target image and target image label;
compare the category vector to the target image label;
when the category vector matches the target label, update the target label based on the category vector and the attribute vector to obtain updated label; and
retrain the inference model using the processed image and the updated label.

11. The system of claim 10, wherein the computer executable code is configured to obtain the similarity score by:
converting each of the target words into a target vector by a word-to-vector model;
converting the category name list and the attribute name list into reference vectors using the word-to-vector model; and
comparing the target vector to the reference vectors in a vector space,
wherein the word-to-vector model is pre-trained with words in fashion.

12. The system of claim 11, wherein the similarity score is defined as 1 when the target vector is the same as one of the inference vectors, the similarity score is defined as 0 when the target vector is remote to all the inference vectors, and the threshold is set at about 0.8.

13. The system of claim 10, wherein each of the labeled fashion entries comprises a label, wherein the label is a word related to a fashion feature of an image.

14. The system of claim 10, wherein the computer executable code is further configured to, when each dimension of the category vector has a value of 0, update the target image label by defining the target image label as empty.

15. The system of claim 10, wherein the computer executable code is further configured to, when the category vector doesn't match the target image label, provide a user interface for updating the target image label.

16. A non-transitory computer readable medium storing computer executable code, wherein the computer executable code, when executed at a processor of a computing device, is configured to perform the method of claim 1.

17. A system for training an inference model, comprising a computer device, the computer device comprising a processor and a storage device storing computer executable code, wherein the computer executable code, when executed at the processor, is configured to perform the method of claim 1.

* * * * *